US011972745B2

(12) United States Patent
Wheeler

(10) Patent No.: US 11,972,745 B2
(45) Date of Patent: Apr. 30, 2024

(54) STORAGE CASE FOR MUSICAL ACCESSORIES

(71) Applicant: James C. Wheeler, Atlanta, GA (US)

(72) Inventor: James C. Wheeler, Atlanta, GA (US)

( * ) Notice: Subject to any disclaimer, the term of this patent is extended or adjusted under 35 U.S.C. 154(b) by 186 days.

(21) Appl. No.: 17/395,545

(22) Filed: Aug. 6, 2021

(65) Prior Publication Data

US 2021/0366446 A1 Nov. 25, 2021

Related U.S. Application Data

(62) Division of application No. 16/255,289, filed on Jan. 23, 2019, now Pat. No. 11,114,073.

(60) Provisional application No. 62/621,971, filed on Jan. 25, 2018.

(51) Int. Cl.

*B65D 85/00* (2006.01)
*G10D 3/00* (2020.01)
*G10D 3/173* (2020.01)
*G10G 7/00* (2006.01)

(52) U.S. Cl.

CPC ............... *G10G 7/005* (2013.01); *G10D 3/00* (2013.01); *G10D 3/173* (2020.02)

(58) Field of Classification Search

CPC ........ B65D 25/04; B65D 25/32; B65D 43/16; B65D 5/66; B65D 5/64; G10G 7/005; G10G 7/00; G10D 3/173; G10D 3/00; F21V 33/0084; A45C 1/12; A45C 13/00; A45C 13/02; A47G 29/00

USPC .......................................................... 206/314

See application file for complete search history.

(56) References Cited

U.S. PATENT DOCUMENTS 241,142 A 5/1881 Keech
706,231 A 8/1902 Goldman
886,345 A 5/1908 Burns
892,969 A * 7/1908 Wilson .................. B65D 25/04 294/146
1,354,211 A * 9/1920 Reed ...................... B65D 25/04 220/524
1,569,157 A 1/1926 Thompson
(Continued)

FOREIGN PATENT DOCUMENTS

CN 305462545 11/2019
GB 1574312 9/1980
WO 2019147760 8/2019

OTHER PUBLICATIONS

Wheeler, James C.; Final Office Action Action for U.S. Appl. No. 16/255,289, filed Jan. 23, 2019, mailed Feb. 25, 2021, 15 pgs.
(Continued)

*Primary Examiner* — Gideon R Weinerth

(74) *Attorney, Agent, or Firm* — PIERSON FERDINAND LLP; Keats Quinalty

(57) ABSTRACT

A storage case for musical accessories includes a bottom wall; an outer sidewall extending from the bottom wall, the outer sidewall and bottom wall defining an interior space; a divider wall extending from the bottom wall between a first location on the outer sidewall and a second location on the outer sidewall, the divider wall configured to divide the interior space into a first compartment and a second compartment; a first lid hingedly attached to the first compartment and configured to enclose the first compartment; and a second lid hingedly attached to the second compartment and configured to enclose the second compartment.

17 Claims, 9 Drawing Sheets

(56) References Cited

U.S. PATENT DOCUMENTS

| | | | | | |
|---|---|---|---|---|---|
| 1,632,335 | A | | 6/1927 | Hiering | |
| 2,315,086 | A | | 3/1943 | Coller | |
| 2,459,921 | A | | 1/1949 | Comer | |
| 2,508,283 | A | | 5/1950 | Nelson et al. | |
| D177,002 | S | * | 3/1956 | Barker | D99/35 |
| 2,784,757 | A | * | 3/1957 | Bosca | A45C 13/1069<br>206/581 |
| 2,870,932 | A | * | 1/1959 | Davis | A01K 97/05<br>43/56 |
| 3,280,966 | A | * | 10/1966 | Boniface | B44D 3/04<br>206/1.7 |
| 3,285,681 | A | * | 11/1966 | Niederer | A45C 1/10<br>312/204 |
| D209,438 | S | | 11/1967 | Rothman | |
| 3,749,301 | A | * | 7/1973 | Peckar | B65D 5/6673<br>229/125.37 |
| 3,934,745 | A | | 1/1976 | Lovell | |
| 4,248,128 | A | | 2/1981 | Des Gaines | |
| 4,403,483 | A | * | 9/1983 | Lisalda | F25D 3/08<br>62/464 |
| 4,418,823 | A | * | 12/1983 | Romick | A61J 7/0076<br>206/459.5 |
| 4,467,693 | A | | 8/1984 | Nasfell, Jr. | |
| 4,611,726 | A | * | 9/1986 | Skinnell | A01K 97/06<br>220/756 |
| 4,738,390 | A | * | 4/1988 | Brennan | B65D 27/12<br>229/77 |
| 4,790,232 | A | | 12/1988 | Rosen | |
| 4,826,014 | A | | 5/1989 | Schefer | |
| D304,644 | S | | 11/1989 | Silcox | |
| D311,027 | S | | 10/1990 | Yuen | |
| D321,983 | S | | 12/1991 | Tackett et al. | |
| 5,123,564 | A | * | 6/1992 | Hobson | B65D 21/02<br>220/530 |
| 5,299,485 | A | | 4/1994 | Denton | |
| 5,366,069 | A | | 11/1994 | Seidner | |
| D354,831 | S | * | 1/1995 | Anderson | D99/35 |
| D358,933 | S | | 6/1995 | Stein | |
| D369,905 | S | | 5/1996 | Hunt | |
| 5,564,805 | A | | 10/1996 | Dickinson | |
| D390,332 | S | | 2/1998 | Searls | |
| D392,796 | S | | 3/1998 | North | |
| 5,810,164 | A | | 9/1998 | Rennecamp | |
| 5,881,904 | A | | 3/1999 | House | |
| 5,981,856 | A | | 11/1999 | Story | |
| 6,059,135 | A | * | 5/2000 | James | E05C 1/04<br>220/244 |
| D431,458 | S | | 10/2000 | Bried et al. | |
| D436,427 | S | * | 1/2001 | Grendahl | D99/35 |
| 6,215,052 | B1 | | 4/2001 | Giddens et al. | |
| 6,283,287 | B1 | | 9/2001 | Carl | |
| 6,460,287 | B1 | * | 10/2002 | Louie | A01K 97/06<br>206/315.11 |
| 6,462,260 | B2 | | 10/2002 | Fediakov | |
| D543,350 | S | | 5/2007 | Sanderson | |
| 7,246,703 | B1 | | 7/2007 | D'Aquisto | |
| 7,419,054 | B1 | | 9/2008 | Clayton | |
| D585,639 | S | | 2/2009 | Taninbaum et al. | |
| D590,152 | S | | 4/2009 | Reines | |
| 7,721,893 | B2 | | 5/2010 | Law | |
| D629,202 | S | | 12/2010 | Wai | |
| D646,893 | S | * | 10/2011 | Whalen | D3/318 |
| D667,605 | S | * | 9/2012 | Hollinger | D99/36 |
| D668,015 | S | * | 9/2012 | Lynch | D99/34 |
| 8,376,303 | B2 | | 2/2013 | Yang et al. | |
| D678,675 | S | | 3/2013 | Lin | |
| D688,434 | S | * | 8/2013 | Kinskey | D32/53 |
| D707,287 | S | | 6/2014 | Thomas | |
| 8,742,239 | B1 | | 6/2014 | Storck | |
| 8,789,745 | B1 | * | 7/2014 | Barbary | A45C 1/12<br>446/8 |
| 9,472,172 | B1 | | 10/2016 | Nassab | |
| 9,837,056 | B1 | | 12/2017 | Davis | |
| 10,494,144 | B2 | * | 12/2019 | Weiss | B65D 43/163 |
| D924,564 | S | * | 7/2021 | Wheeler | D3/294 |
| 11,114,073 | B2 | | 9/2021 | Wheeler | |
| 11,220,371 | B1 | * | 1/2022 | Booth | B65D 21/0205 |
| 11,297,915 | B1 | * | 4/2022 | Booth | A45C 11/24 |
| D962,642 | S | * | 9/2022 | Wheeler | D3/294 |
| D966,706 | S | * | 10/2022 | Wheeler | D3/294 |
| D974,759 | S | * | 1/2023 | Wheeler | D3/294 |
| 2002/0048414 | A1 | | 4/2002 | Wilfer | |
| 2004/0029518 | A1 | | 2/2004 | Tanidis et al. | |
| 2004/0183313 | A1 | * | 9/2004 | Sherman | E05C 19/16<br>292/251.5 |
| 2005/0173272 | A1 | * | 8/2005 | Lemmons, IV | A24F 23/00<br>206/256 |
| 2005/0230465 | A1 | * | 10/2005 | Metzler | B65D 5/727<br>229/131.1 |
| 2005/0247596 | A1 | * | 11/2005 | Manley | A45C 11/20<br>206/775 |
| 2006/0076260 | A1 | | 4/2006 | Luburic | |
| 2006/0096440 | A1 | | 5/2006 | Weathersby | |
| 2008/0156667 | A1 | | 7/2008 | Huggins | |
| 2008/0302696 | A1 | | 12/2008 | Moore | |
| 2009/0301913 | A1 | | 12/2009 | Scaletta et al. | |
| 2010/0012739 | A1 | | 1/2010 | Hoeth | |
| 2010/0116692 | A1 | | 5/2010 | Depuydt et al. | |
| 2010/0116825 | A1 | * | 5/2010 | Young | B65D 25/04<br>220/524 |
| 2010/0230307 | A1 | | 9/2010 | Kriesel | |
| 2011/0024421 | A1 | | 2/2011 | Luburic | |
| 2011/0226643 | A1 | | 9/2011 | Kates et al. | |
| 2012/0076565 | A1 | | 3/2012 | Cocchioni | |
| 2012/0153114 | A1 | * | 6/2012 | Yang | F16M 11/22<br>248/346.04 |
| 2013/0134282 | A1 | | 5/2013 | Negretti | |
| 2013/0277529 | A1 | | 10/2013 | Bolliger | |
| 2014/0123513 | A1 | | 5/2014 | Ciffin | |
| 2015/0060463 | A1 | * | 3/2015 | Ragha | B65D 43/161<br>220/554 |
| 2015/0200556 | A1 | * | 7/2015 | Garcia | H02J 7/0045<br>455/573 |
| 2015/0206520 | A1 | | 7/2015 | Hoeft et al. | |
| 2015/0300556 | A1 | * | 10/2015 | Fan | F16M 13/00<br>248/346.03 |
| 2015/0305402 | A1 | * | 10/2015 | Bourgoin | B05D 1/26<br>206/265 |
| 2015/0310842 | A1 | * | 10/2015 | Coburn | G10G 7/005<br>206/314 |
| 2016/0272122 | A1 | | 9/2016 | Dunham et al. | |
| 2016/0374440 | A1 | * | 12/2016 | Lundy | A45C 13/36<br>190/111 |
| 2017/0210524 | A1 | | 7/2017 | Dougherty | |
| 2017/0241590 | A1 | | 8/2017 | Boubli | |
| 2017/0334613 | A1 | * | 11/2017 | Angeloni | B65D 43/161 |
| 2018/0141714 | A1 | * | 5/2018 | Kanbar | A24F 15/12 |
| 2018/0166049 | A1 | | 6/2018 | Young | |
| 2019/0189099 | A1 | | 6/2019 | Bedore et al. | |
| 2019/0228753 | A1 | * | 7/2019 | Wheeler | G10G 7/005 |
| 2019/0254454 | A1 | | 8/2019 | Boyatt | |
| 2019/0276193 | A1 | * | 9/2019 | French | B65D 5/6632 |
| 2020/0126520 | A1 | * | 4/2020 | Flynn | G10D 1/05 |
| 2021/0383780 | A1 | | 12/2021 | Wheeler | |

OTHER PUBLICATIONS

Wheeler, James C.; Non-Final Office Action for U.S. Appl. No. 16/255,289, filed Jan. 23, 2019, mailed Oct. 19, 2020, 35 pgs.

Wheeler, James C.; Notice of Allowance for U.S. Appl. No. 16/255,289, filed Jan. 23, 2019, mailed May 4, 2021, 8 pgs.

Wheeler, James C.; International Preliminary Report on Patentability for PCT Application No. PCT/US19/14887, filed Jan. 24, 2019, mailed Jul. 28, 2020, 9 pgs.

Wheeler, James C.; International Search Report and Written Opinion for PCT Application No. PCT/US19/14887, filed Jan. 24, 2019, mailed Apr. 12, 2019, 11 pgs.

Amazon; Article entitled: MAUL Cash Money Box with Coin Slot, Cylinder Lock with 2 keys, 125x95x60mm, available at <https://www.amazon.co.uk/MAUL-Cash-money-Coin-Cylinder/dp/B00381H5YW?th=1>, dated Aug. 15, 2012, 4 pgs.

(56) References Cited

OTHER PUBLICATIONS

Wheeler, James C.; European search report for application No. 19743777.5, filed Jan. 24, 2019, mailed Sep. 10, 2021, 16 pgs.
AxePaxe, posted at axepaxe.com, no posting date, retrieved Jan. 18, 20, online, U RL:https://axepaxe.com/product/axe-paxe/ (Year: 2020).
Gear Review: AxePaxe, posted at youtube.com, posted Mar. 22, 2018, retrieved Jan. 18, 2020, online, URL:https://www.youtube.com/watch?v=p645I8OCnQg (Year: 2018).
Wheeler, James C.; Applicant-Initiated Interview Summary for U.S. Appl. No. 29/677,772, filed Jan. 23, 2019, mailed Feb. 19, 2020, 3 pgs.
Wheeler, James C.; Applicant-Initiated Interview Summary for U.S. Appl. No. 29/677,772, filed Jan. 23, 2019, mailed Sep. 3, 2020, 3 pgs.
Wheeler, James C.; Corrected Notice of Allowance for U.S. Design U.S. Appl. No. 29/677,772, filed Jan. 23, 2019, mailed Jun. 1, 2021, 10 pgs.
Wheeler, James C.; Ex Parte Quayle Action for U.S. Design U.S. Appl. No. 29/677,772, filed Jan. 23, 2019, mailed Oct. 13, 2020, 11 pgs.
Wheeler, James C.; Final Office Action for U.S. Appl. No. 29/677,772, filed Jan. 23, 2019, mailed Jun. 11, 2020, 10 pgs.
Wheeler, James C.; Non-Final Office Action for U.S. Appl. No. 29/677,772, filed Jan. 23, 2019, mailed Jan. 22, 2020, 24 pgs.
Wheeler, James C.; Notice of Allowance for U.S. Design U.S. Appl. No. 29/677,772, filed Jan. 23, 2019, mailed Feb. 25, 2021, 11 pgs.
The Solution; Article entitled: "Introducing the Round Tackle Box", published Mar. 26, 2012, retrieved from Internet: URL:http://web.archive.org/web/20120326134839/http:roundtacklebox.com/, retrieved on Jan. 10, 2022, 2 pgs.
Wheeler, James C.; Extended European search report for application No. 19743777.5, filed Jan. 24, 2019, mailed Jan. 19, 2022, 16 pgs.
Axe Paxe in Gunmetal, facebook.com, posted Apr. 24, 2019, retrieved Oct. 21, 2021, online, URL: https://www.facebook.com/axepaxeofficial/photos/a.2133561943426463/2133562133426444/?type=3&theater (Year: 2019).
Axe Paxe Review, posted at youtube.com, posted on Dec. 21, 2019, retrieved Oct. 21, 21, online, URL: https://www.youtube.com/watch?v=Rixr1 okmG88 (Year: 2019).
Cash drawer, posted at youtube.com, posted Feb. 25, 2014, retrieved Oct. 21, 2021, online, URL:https://www.youtube.com/watch?v=h3DSVQX46aA (Year: 2014).
DIY Wooden Desktop Storage Box, posted at amazon.com, first available Aug. 16, 2018, retrieved Oct. 21, 2021, online, URL: https://www.amazon.com/Desktop-Consol idation-Register-Document-Organizer/dp/B07GH2 B P3V?th= 1 (Year: 2018).
Lipper International 824 Bamboo Wood 4-Compartment Organizer Tray, 11 5/8" x 7 7/8" x 1 3/4", posted at amazon. com, review dated Jul. 27, 2016, retrieved Oct. 21, 21, online, URL: https://www.amazon.com/Lipper-International-824-4- Compartment-Organizer/dp/BOO KAZ 12OS/ref=sr _ 1 _ 1 ?crid =3SA4CQH U E RC38 &dchi Id= 1 &keyw (Year: 2016).
Wheeler, James C.; Non-Final Office Action for U.S. Design U.S. Appl. No. 29/796,223, filed Jun. 23, 2021, mailed Oct. 26, 2021, 24 pgs.
The AxePaxe@ in Gun Metal, posted at facebook.com, posted Apr. 24, 2019, retrieved Oct. 22, 2021, online, URL: https://www .facebook.com/axepaxeofficial/photos/a.2133561943426463/2133561996759791 /?type=3&theater (Year: 2019).
Wheeler, James C.; Non-Final Office Action for U.S. Design U.S. Appl. No. 29/796,250, filed Jun. 23, 2021, mailed Oct. 26, 2021, 26 pgs.
The AxePaxe@ in Gun Metal, posted at facebook.com, posted Apr. 24, 2019, retrieved Oct. 22, 2021, online, URL:https://www.facebook.com/axepaxeofficial/photos/a.2133561943426463/2133562100093114/?type=3&theater (Year: 2019).
Wheeler, James C.; Non-Final Office Action for U.S. Design U.S. Appl. No. 29/796,253, filed Jun. 23, 2021, mailed Oct. 26, 2021, 25 pgs.

* cited by examiner

STORAGE CASE FOR MUSICAL ACCESSORIES

CROSS-REFERENCE TO RELATED APPLICATION

The present application is a divisional of U.S. application Ser. No. 16/255,289, filed Jan. 23, 2019, which claims priority to U.S. Provisional Application No. 62/621,971, filed Jan. 25, 2018, both of which are hereby specifically incorporated by reference herein in their entireties.

TECHNICAL FIELD

This disclosure relates to storage. More specifically, this disclosure relates to a storage case for storing accessories for a musical instrument.

BACKGROUND

Musical instruments often have many accessories associated therewith. For example, accessories for a guitar can include, but are not limited to, traditional triangular-type guitar picks, guitar slides, thumb/finger picks, finger guards, tuners, strings, string cutters, string winders, straps, polish, polishing cloths, and capos. Often, a musician has a plurality of such accessories. It can be difficult to keep track of the many accessories and to keep the accessories organized and close at hand for easy access when needed. Furthermore, the musical accessories for an instrument can often be small in size, which can make them easy to lose or misplace.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts of the disclosure as an introduction to the following complete and extensive detailed description.

Disclosed is a storage case for musical accessories comprising a compartment configured to receive a musical accessory therein, the compartment comprising a floor and a sidewall enclosure extending from the floor, the sidewall enclosure defining an opening distal from the floor; and a lid defining a first orifice configured to receive the musical accessory inserted therethrough, the lid movable between a closed position, wherein the opening is covered by the lid, and an open position, wherein the opening is uncovered by the lid.

Also disclosed is a storage case for musical accessories comprising a bottom wall; an outer sidewall extending from the bottom wall, the outer sidewall and bottom wall defining an interior space; a divider wall extending from the bottom wall between a first location on the outer sidewall and a second location on the outer sidewall, the divider wall configured to divide the interior space into a first compartment and a second compartment; a first lid hingedly attached to the first compartment and configured to enclose the first compartment; and a second lid hingedly attached to the second compartment and configured to enclose the second compartment.

Also disclosed is a method for using a storage case for musical accessories, the method comprising providing the storage case, the storage case comprising a compartment and a lid, the compartment defining an interior configured to receive musical accessories, the lid configured to cover an opening of the compartment to enclose the interior; inserting a musical accessory into the interior of the compartment through an orifice in the lid; receiving the musical accessory on one of an accessory tray and an accessory mount; and retrieving the musical accessory from the interior of the compartment.

Additionally, a storage case for musical accessories is disclosed, the storage case comprising a bottom wall; an outer sidewall extending from the bottom wall, the outer sidewall and bottom wall defining an interior space; a divider wall extending from the bottom wall between a first location on the outer sidewall and a second location on the outer sidewall, the divider wall configured to divide the interior space into a first compartment and a second compartment; a first lid hingedly attached to the first compartment and configured to enclose the first compartment; and a second lid hingedly attached to the second compartment and configured to enclose the second compartment.

Furthermore, disclosed is a storage case for musical accessories comprising a first compartment defining a first opening at a top end thereof; a second compartment defining a second opening at a top end thereof, the second compartment comprising a sectioning wall that sections the second compartment into a plurality of alcoves; a first lid configured to cover the first opening of the first compartment, the first lid defining an orifice allowing access to an interior of the first compartment; and a second lid configured to cover the second opening of the second compartment.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
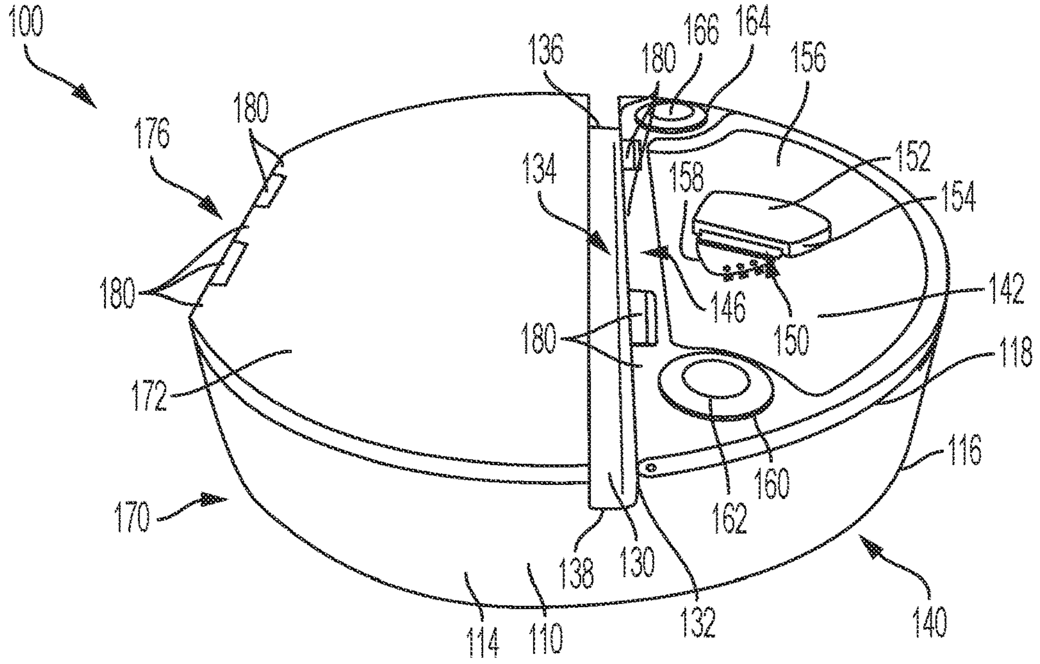
FIG. 1 is a top perspective view of a storage case, in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms “a,” “an” and “the” include plural referents unless the context clearly dictates otherwise. Thus, for example, reference to “an element” can include two or more such elements unless the context indicates otherwise.

Ranges can be expressed herein as from “about” one particular value, and/or to “about” another particular value. When such a range is expressed, another aspect includes from the one particular value and/or to the other particular value. Similarly, when values are expressed as approximations, by use of the antecedent “about,” it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms “optional” or “optionally” mean that the subsequently described event or circumstance can or cannot occur, and that the description includes instances where said event or circumstance occurs and instances where it does not.

The word “or” as used herein means any one member of a particular list and also includes any combination of members of that list. Further, one should note that conditional language, such as, among others, “can,” “could,” “might,” or “may,” unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed in the present application is a storage case and associated methods, systems, devices, and various apparatus. Example aspects of the storage case can comprise a compartment configured to receive musical accessories therein, a lid for covering an opening of the compartment, and an orifice formed in the compartment through which musical accessories can be inserted. It would be understood by one of skill in the art that the disclosed storage case is described in but a few exemplary aspects among many. No particular terminology or description should be considered limiting on the disclosure or the scope of any claims issuing therefrom.

FIG. 1 illustrates a first aspect of a storage case 100 according to the present disclosure. Example aspects of the storage case 100 can be configured to receive accessories for a musical instrument therein. For example, the musical instrument can be a guitar or any other musical instrument known in the art. Accessories for a guitar can include, for example, traditional triangular-type guitar picks 205 (shown in FIG. 2C), guitar slides, thumb/finger picks, finger guards, tuners, strings, string cutters, string winders, straps, polish, polishing cloths, and capos.

As shown, the storage case 100 can comprise an outer sidewall 110. The outer sidewall 110 can define an inner sidewall surface 212 (shown in FIG. 2A) and an outer sidewall surface 114. In example aspects, such as the present aspect, the outer sidewall 110 can define a substantially circular cross-sectional shape. In other aspects, the outer sidewall 110 can define another cross-sectional shape, such as, for example, rectangle, triangle, oval, or any other suitable shape known in the art. A bottom end 116 of the outer sidewall 110 can be connected to a bottom wall 220 (shown in FIG. 2A). In some aspects, the outer sidewall 110 can be monolithically formed with the bottom wall 220, while in other aspects, the outer sidewall 110 can be connected to the bottom wall 220 by a fastener, such as, for example, glue, screws, welding or any other suitable fastener known in the art. Example aspects of the bottom wall 220 can define an upper bottom wall surface 222 (shown in FIG. 2A) and a lower bottom wall surface 824 (shown in FIG. 8).

According to example aspects, the storage case 100 can be divided into a first compartment 140 and a second compartment 170 by a divider wall 130, a top end 132 of which can be seen in FIG. 1. The divider wall 130 can extend generally upward from the bottom wall 220 and can extend between a first location 136 on the outer sidewall 110 and a second location 138 on the outer sidewall 110, wherein the second location 138 is different from the first location 136. As shown in the present aspect, the second location 138 can be located substantially opposite the first location 136. In some aspects, the first and second compartments 140, 170 can define varying sizes—for example, the second compartment 170 can be larger than the first compartment 140, as shown. In other aspects, the first and second compartments 140, 170 can be substantially equal in size and shape and can define the first and second compartments 140, 170 as approximately semicircular halves of the circular shape of the storage case 100. However, in other aspects, the first and second locations 136, 138 can be located at any other suitable location on the outer sidewall 110, and therefore the first and second compartments 140, 170 can vary in size and shape. Example aspects of the top end 132 of the divider wall 130 can define an upper divider wall groove 134 formed lengthwise therein. The storage case 100 can comprise a first lid 142 for covering a first opening 244 (shown in FIG. 2A) of the first compartment 140 at a top end 118 of the outer sidewall 110. The storage case 100 can further comprise a second lid 172 for covering a second opening 774 (shown in FIG. 7) of the second compartment 170 at the top end 118 of the outer sidewall 110. In example aspects, various components of the storage case 100, including the outer sidewall 110, the bottom wall 220, the divider wall 130, and the first and second lids 142, 172, can be formed from a plastic material. In other aspects, one or all of the components of the storage case 100 can be formed from another material, such as, for example, metal, wood, rubber, carbon fiber, or any other suitable material or combination of materials.

In example aspects, each of the first lid 142 and second lid 172 can be connected to the first compartment 140 and second compartment 170, respectively, by a fastener. For example, as illustrated in the present aspect, the first lid 142 can be connected to the first compartment 140 by a first hinge 146, and the second lid 172 can be connected to the second compartment 170 by a second hinge 176. The first and second hinges 146, 176 can allow each of the first and second lids 142, 172 to independently pivot between an open position, wherein the first and second openings 244, 774, respectively, are uncovered, and a closed position, wherein the first and second openings 244, 774, respectively, are covered. In other aspects, the first lid 142 and/or second lid 172 can be attached to the first and second compartments 140, 170, respectively, by any other suitable fastener known in the art. In the present aspect, the first lid 142 can be hingedly connected to the first compartment 140 at the top end 132 of the divider wall 130, and the second lid 172 can be hingedly connected to the second compartment 170 at the top end 118 of the outer sidewall 110. Thus, the first and second compartments 140, 170 can be hinged on matching sides of each compartment 140, 170 and can thus open in the same direction for easy access by a user. According to example aspects, each of the first and second hinges 146, 176 can comprise one or more hinge pins 246 (shown in FIG. 2A) extending through one or more knuckles 180 formed in the corresponding lid (i.e., the first or second lid 142, 172) and the corresponding compartment (i.e., first or second compartment 140, 170). Example aspects of the first and second hinges 146, 176 can comprise a plastic material, a metal material, such as steel, brass, or bronze, or any other suitable material known in the art or combination thereof.

The first lid 142 can define a first orifice, such as a slot 150, extending therethrough. Example aspects of the slot 150 can be uncovered to allow for the insertion of one or more musical accessories into an interior of the first compartment 140 without requiring the first lid 142 to be in the open position. For example, in the present aspect, the slot 150 can be sized and shaped to receive the triangular guitar pick 205 (shown in FIG. 2C) therethrough, or any other flat guitar pick 205. As shown, in some aspects, the slot 150 can be formed in a protuberance 152. The protuberance 152 can extend generally vertically upward from a top surface 156 of the first lid 142, relative to the orientation shown, and the slot 150 can be formed in a substantially vertically oriented side 154 thereof. As such, the pick 205 or another musical accessory can be inserted through the slot 150 in a generally horizontal direction, such as by sliding the pick 205, relative to the orientation shown. Upon insertion through the slot 150, the pick 205 can fall substantially vertically downward into the interior of the first compartment 140, relative to the orientation shown, due to the force of gravity.

According to various aspects, a logo or image 158 can be embossed or otherwise formed in the top surface 156 of the first lid 142, as shown. In other aspects, a logo or image can alternatively or additionally be located at any other suitable location on the storage case 100. For example, in one aspect, a logo or image can be printed on a decal (not shown), and the decal can be attached to the storage case 100 on the second lid 172, or at any other suitable location. In still other aspects, the logo or image can be printed directly on the storage case 100, or can be embossed, debossed, stamped, or otherwise formed on or attached to the storage case 100 by any other suitable means known in the art.

According to example aspects, the first lid 142 can further define a second orifice, such as a first bore 160, extending therethrough. Some aspects of the first lid 142, as shown, can also define a third orifice, such as a second bore 164, extending therethrough. A first cap 162 can be provided and can be configured to removably cover the first bore 160, and similarly, a second cap 166 can be provided and can be configured to removably cover the second bore 164. As shown, in some aspects, each of the first cap 162 and second cap 166 can define a beveled edge. Other aspects may not define the beveled edge. The first and second caps 162, 166 are shown and described in further detail with respect to FIGS. 2A and 3.

Figure 2A:
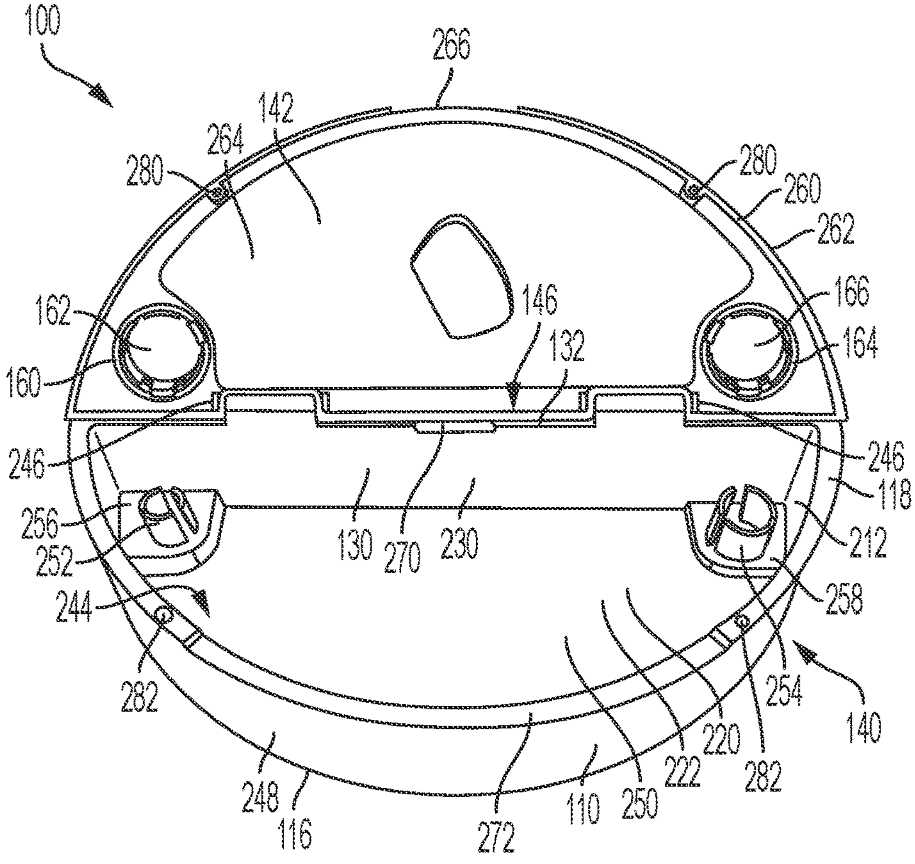
FIG. 2A is a top perspective view showing an interior of a first compartment of the storage case of FIG. 1.

FIG. 2A illustrates the first lid 142 in the open position, such that the first opening 244 is uncovered and the interior of the first compartment 140 is visible. As shown, the divider wall 130 can extend upward from the bottom wall 220, relative to the orientation shown, from the bottom end 116 of the outer sidewall 110 to the top end 118 of the outer sidewall 110. Example aspects of the divider wall 130 can define a first divider wall surface 230 facing the interior of the first compartment 140, as shown. The divider wall 130 and a portion of the outer sidewall 110 can define a sidewall enclosure 248 of the first compartment 140, and a portion of the bottom wall 220 can define a floor 250 of first compartment 140. The first opening 244 of the first compartment 140 can be defined by the top end 132 of the divider wall 130 and a portion of the top end 118 of the outer sidewall 110. The first and second caps 162, 166 can cover the first and second bores 160, 164, respectively.

As shown, a first lid ridge 260 can extend from a peripheral edge 262 of a bottom surface 264 of the first lid 142. The first lid ridge 260 can be configured to abut a portion of the top end 118 of the outer sidewall 110 when the first lid 142 is in the closed position. In some aspects, the first lid ridge 260 can also abut the top end 132 of the divider wall 130 in the closed position. According to example aspects, a first finger groove 266 can be formed in the first lid ridge 260, as shown. For example, the first finger groove 266 can be formed in the portion of the first lid ridge 260 that can abut outer sidewall 110. Furthermore, in some aspects, the first finger groove 266 can be located substantially opposite from the divider wall 130 and the first hinge 146. A user can engage the first finger groove 266 with one or more fingers and can lift the first lid 142 upward to easily pivot the first lid 142 from the closed position to the open position.

According to example aspects, the first lid 142 can further comprise one or more connectors, such as, for example, magnets 280, attached thereto. As shown, the magnets 280 can be attached to the bottom surface 264 of the first lid 142 proximate the first lid ridge 260. Mating connectors, such as mating magnets 282, can be attached at the top end 118 of the outer sidewall 110, as shown. The magnets 280 and mating magnets 282 can mate together by magnetic force to releasably couple the first lid 142 to the outer sidewall 110 in the closed position. To move the first lid 142 to the open position, a sufficient amount of manual force can be applied to overcome the magnetic force and to pull/push the first lid 142 away from the outer sidewall 110. The strength of the magnets 280 and mating magnets 282 can vary, as desired by the manufacturer. For example, in a first aspect, the strength of the magnets 280 and mating magnets 282 can be minimal, such that a minimal manual force is required to overcome the magnetic force. In a second aspect, the strength of the magnets 280 and mating magnets 282 can be substantial, such that a substantial manual force is required to overcome the magnetic force. According to example aspects, the second lid 172 can be releasable coupled to the divider wall 130 in a similar manner.

Example aspects of the divider wall 130 can define a first accessory tray recess 270 formed in the top end 132 thereof, and example aspects of the outer sidewall 110 can define a second accessory tray recess 272 formed in the top end 118 thereof. The first and second accessory tray recesses 270, 272 of the first compartment 140 can be configured to support an accessory tray 570 (shown in FIG. 5). The accessory tray 570 is described further below with reference to FIGS. 5 and 6.

Figure 2B:
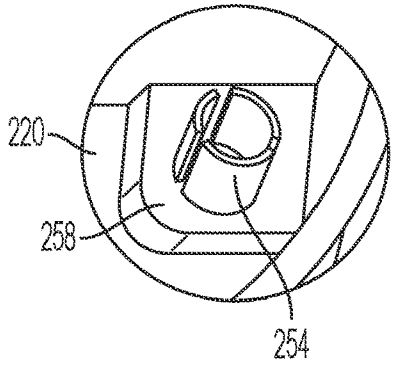
FIG. 2B is a detail view of another aspect of an accessory mount of the first compartment of FIG. 2A.

Example aspects of the first compartment 140 can comprise a first accessory mount 252, and some aspects can further include a second accessory mount 254. In example aspects, each of the first and second accessory mounts 252, 254 can be formed as a segmented cylinder extending generally upward from the bottom wall 220. In the present aspect, each of the first and second segmented cylinders can be segmented lengthwise. In other aspects, the first and/or second cylinder may not be segmented. The first and second accessory mounts 252, 254 can each be configured for mounting a musical accessory thereon, such as, for example, a slide, a thumb/finger pick or a finger guard. According to example aspects, the first accessory mount 252 can be substantially vertically aligned with the first bore 160 of the first lid 142, relative to the orientation shown, when the first lid 142 is in the closed position, and similarly, the second accessory mount 254 can be substantially vertically aligned with the second bore 164 when the first lid 142 is in the closed orientation. As shown, in some aspects, the first accessory mount 252 can be supported on an elevated base 256 formed on the bottom wall 220. Furthermore, in some aspects, as shown in FIGS. 2A and 2B, the second accessory mount 254 can also be supported on an elevated base 258. In other aspects, only one or none of the first and second accessory mounts 252, 254 can be supported on an elevated base 256, 258. In the present aspect, a height of the elevated base 258 of the second accessory mount 254 can be less than a height of the elevated base 256 (shown in FIG. 2A) of the first accessory mount 252 (shown in FIG. 2A) to, for example, account for slides of different lengths or place the slides at different heights. Furthermore, according to example aspects, diameters of the first and second accessory mounts 252, 254 can be substantially equal or can vary from one another. For example, in one aspect, the diameter of the second accessory mount 254 can be greater than the diameter of the first accessory mount 252, or vice versa, to account for slides of different diameters.

Figure 2C:
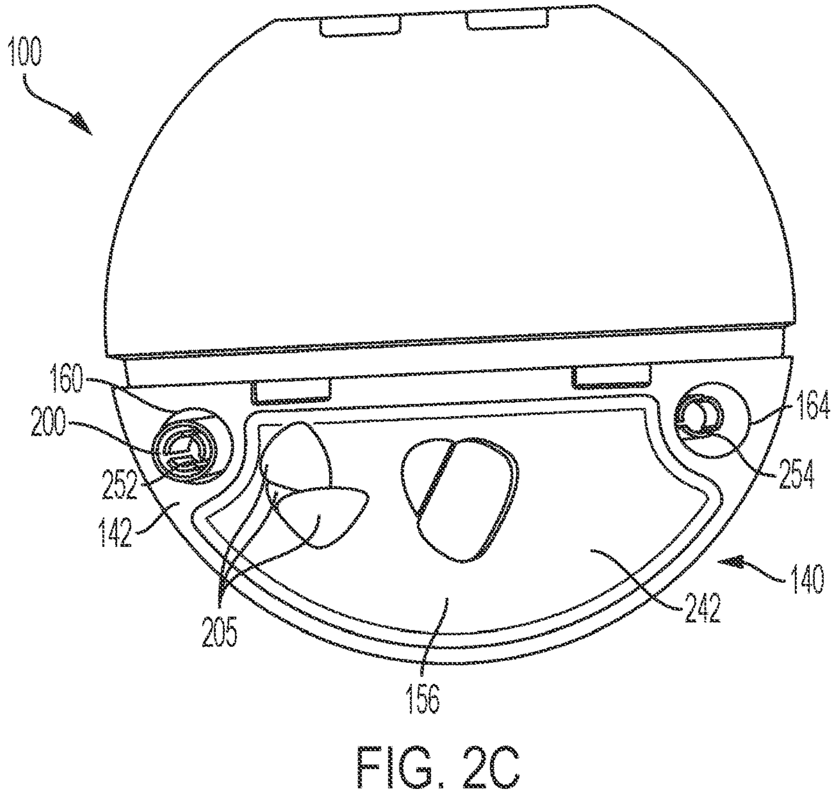
FIG. 2C is a top view of the storage case of FIG. 1.

Referring to FIG. 2C, according to example aspects, the first and second caps 162, 166 (shown in FIG. 1) can be selectively removed from the first lid 142 to uncover the first and second bores 160, 164, respectively. When either of the first and second bores 160, 164 are uncovered, a musical accessory, such as a guitar slide 200, thumb/finger pick, or a finger guard, can be inserted or partially inserted into the interior of the first compartment 140 through the first or second bore 160, 164 and can be mounted to the first or second accessory mount 252, 254, respectively. For example, in one aspect, a user can insert a slide 200 through the first bore 160 and can engage the slide 200 with the first accessory mount 252 to retain the slide 200 thereon. In some aspects, a portion of the slide 200 can extend above first bore 160, as shown, and in other aspects, the slide 200 (or other musical accessory) can be fully received within the interior of the first compartment 140. The elevated base 256 can be used for accommodating slides 200 or other accessories that have a different size than a depth of the first compartment 140, or can be used to partially receive a slide 200 in the first bore 160 to allow for easier removal. In aspects wherein the slide 200 is fully received within the first compartment 140, the first cap 162 (shown in FIG. 1) can be replaced on the first lid 142 to cover the first bore 160 and to enclose the slide 200 within the first compartment 140, if desired.

To retrieve the slide 200 from the first compartment 140, the first cap 162 (if present) can be removed to uncover the first bore 160. The user can insert one or more fingers of their hand 402 (shown in FIG. 4) through the first bore 160 to engage the slide 200. In aspects wherein the slide 200 extends above the first bore 160, the user may not need to insert their finger(s) through the first bore 160. The user can then manually withdraw the slide 200 from the first compartment 140. In another aspect, the user can move the first lid 142 from the closed position to the open position to uncover the first opening 244 (shown in FIG. 2A) to retrieve the slide 200.

Also illustrated in FIG. 2C, example aspects of the first lid 142 can define a concavity 242 formed in the top surface 156 thereof. As shown, one or more musical accessories, such as picks 205, can be received in the concavity 242 of the first lid 142. Example aspects of the top surface 156, or a portion thereof, can define a non-slip surface. For example, the top surface 156 can be formed from or coated with a non-slip material to aid in preventing the picks 205, or other musical accessories, from sliding on the top surface 156. In a particular aspect, the first lid 142 can be formed from a plastic material and the top surface 156 can be coated with a rubberized paint. In another aspect, the first lid 142 can be formed from a plastic material and the top surface 156 can define a textured plastic surface to increase friction between the top surface 156 and accessories received thereon.

An example method for using the storage case 100 can comprise inserting a musical accessory (e.g., the pick 205) into an interior of a compartment (e.g., the first compartment 140) through an orifice (e.g., the slot 150 (shown in FIG. 1), the first bore 160, or the second bore 164) in a lid (e.g., the first lid 142) of the compartment. Some aspects of the method can further comprise receiving the musical accessory on the accessory tray 570 (shown in FIG. 5) within the interior of the compartment. Other aspects of the method can comprise receiving the musical accessory on an accessory mount (e.g., the first accessory mount 252 or the second accessory mount 254) within the interior of the compartment.

Example aspects of the method can further comprise retrieving the musical accessory from the interior of the compartment. In a first aspect, retrieving the musical accessory can comprise moving the lid from a closed position to an open position, reaching into the interior of the compartment to grasp the musical accessory, and withdrawing the musical accessory from the interior of the compartment. In a second aspect, retrieving the musical accessory can comprise removing a cap (e.g., the first cap 162 or the second cap 166) covering an orifice (e.g., the first bore 160 or the second bore 164) formed in the lid, extending at least one finger through the orifice into the interior of the compartment, engaging the musical accessory with the at least one finger, or another finger, and withdrawing the musical accessory from the interior of the compartment.

Figure 3:
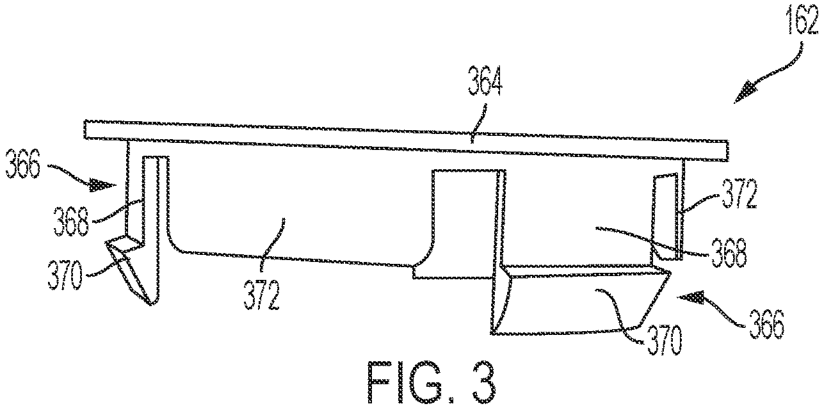
FIG. 3 is a side view of a cap for covering an opening in the first compartment of FIG. 2A.

FIG. 3 illustrates an example aspect of the first cap 162. The second cap 166 (shown in FIG. 1) can be substantially the same as the first cap 162. As shown, the first cap 162 can comprise an upper disc 364 configured to engage the top surface 156 (shown in FIG. 1) of the first lid 142 (shown in FIG. 1) and to cover the first bore 160 (shown in FIG. 1). Example aspects of the upper disc 364 can define a diameter greater than a diameter of the first bore 160, such that the upper disc 364 can rest on the top surface 156 of the first lid 142 and cannot pass through the first bore 160. The first cap 162 can further define one or more connectors 366 extending generally downward from the upper disc 364, relative to the orientation shown. In the present aspect, the each of the connectors 366 can define a leg portion 368 extending from the upper disc 364 and a ledge portion 370 distal from the upper disc 364. The connectors 366 can be configured to extend through the first bore 160 and the ledge portion 370 can engage the bottom surface 264 (shown in FIG. 2A) of the first lid 142 to prevent unintended removal of the first cap 162 from the first lid 142. Example aspects of the first cap 162 can be formed from a resilient and flexible material, such as, for example, rubber, so that the connectors 366 can flex and pass through the first bore 160 when a user applies an intentional pulling force to the upper disc 364 to remove the first cap 162 from the first lid 142. In other aspects, the first cap 162 can be formed from any other suitable material, including more rigid materials, such as plastic, metal, or the like. In one particular aspect, the first cap 162 can be formed from a semi-rigid plastic that can allow for a small amount of flexing when removed from or replaced on the first lid 142.

In some aspects, the first cap 162 can further comprise one or more grippers 372 extending generally downward from the upper disc 364. In the present aspect, a gripper 372 can be positioned between each adjacent pair of connectors 366. The gripper 372 can be configured to engage a peripheral edge (not shown) of the first bore 160 (shown in FIG. 1) to provide an improved seal between the first cap 162 and the first lid 142 (shown in FIG. 1).

Figure 4:
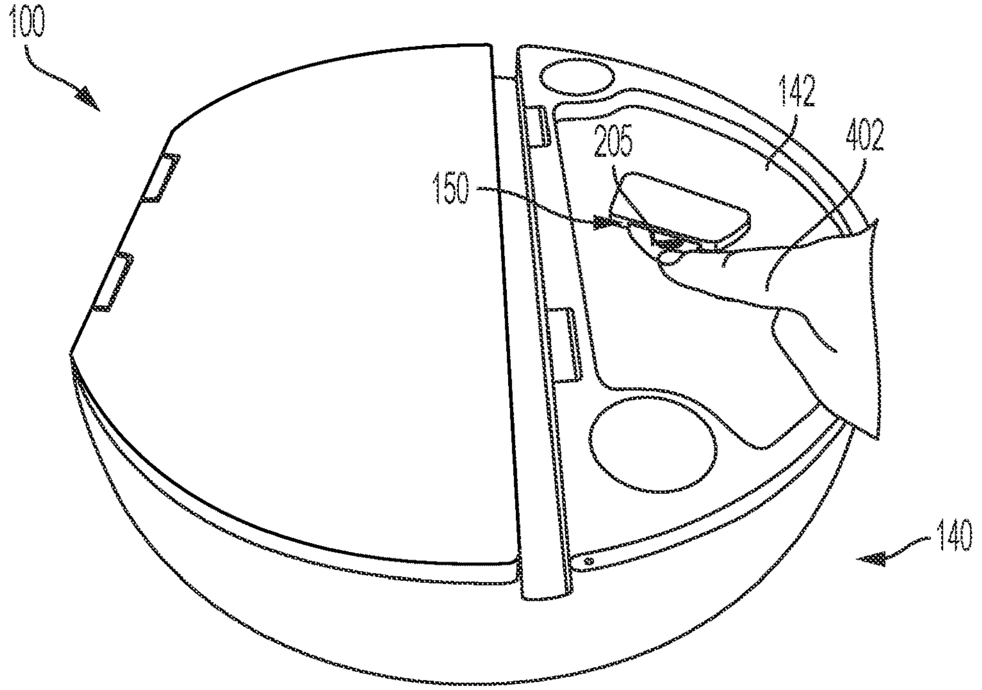
FIG. 4 is a top perspective view of the storage case of FIG. 1 illustrating the insertion of an accessory into the interior of the first compartment of FIG. 2A.
Figure 5:
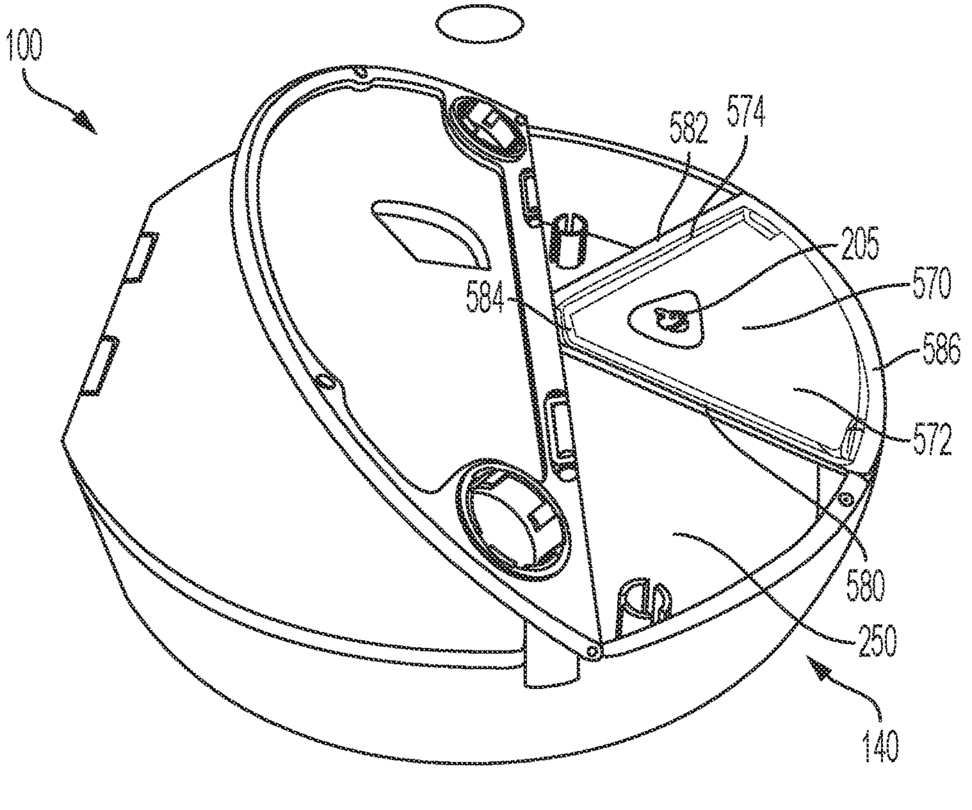
FIG. 5 is a top perspective view of the accessory of FIG. 4 received in the interior of the first compartment of FIG. 2A on an accessory tray.

FIG. 4 illustrates one of the picks 205 being inserted through the slot 150 formed in the first lid 142. As shown, the pick 205 can be slid in a generally horizontal direction through the slot 150 (for example, manually by the hand 402 of a user). Once inserted through the slot 150, the pick 205 can fall into the interior of the first compartment 140. FIG. 5 illustrates the pick 205 received in the interior of the first compartment 140. The accessory tray 570 can be supported by the first accessory tray recess 270 (shown in FIG. 2A) and the second accessory tray recess 272 (shown in FIG. 2A), such that the accessory tray 570 can be elevated above the floor 250 of the first compartment 140, as shown. Open space can be defined between the floor 250 and the accessory tray 570, such that other musical accessories can be stored therebetween.

Figure 6:
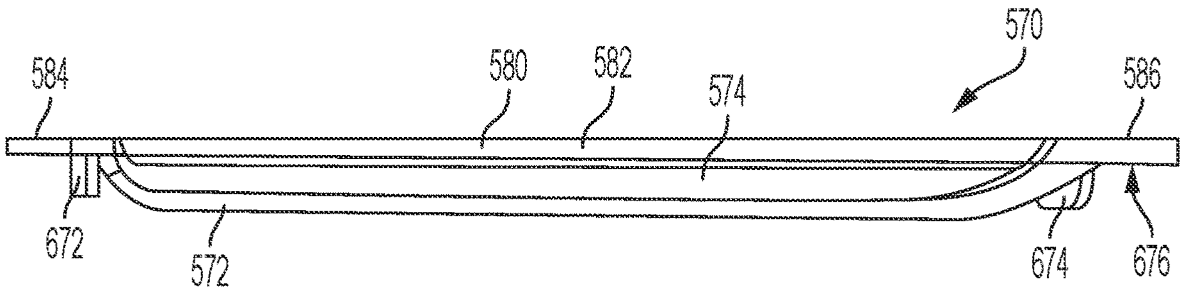
FIG. 6 illustrates a side view of the accessory tray of FIG. 5.

As shown in FIGS. 5 and 6, in example aspects, the accessory tray 570 can define an accessory support surface 572 for supporting musical accessories, such as the pick 205, a shallow sidewall 574 extending generally upward from the accessory support surface 572, and a mounting frame 580 extending from the sidewall 574 distal from the accessory support surface 572. Example aspects of the mounting frame 580 can define a continuous mounting ledge 582 extending from the sidewall 574, wherein a first engagement portion 584 of the mounting ledge 582 can engage the first accessory tray recess 270 and a second engagement portion 586 of the mounting ledge 582 can engage the second accessory tray recess 272 to mount the accessory tray 570 in the first compartment 140. As such, the accessory tray 570 can be mounted and un-mounted and/or removed by a user, as desired. In another aspect of the accessory tray 570, the mounting frame 580 can define a first mounting tab (not shown) that can engage the first accessory tray recess 270 and a second mounting tab (not shown) that can engage the second accessory tray recess 272.

Referring to FIG. 6, the accessory tray 570 can further define a first stop wall 672 and a second stop wall 674. The first stop wall 672 can extend substantially downward from a bottom surface 682 of the mounting ledge 582, relative to the orientation shown, proximate to the first engagement portion 584 of the mounting ledge 582. Similarly, the second stop wall 674 can extend substantially downward from the bottom surface 682 of the mounting ledge 582, relative to the orientation shown, proximate to the second engagement portion 586 of the mounting ledge 582. The first stop wall 672 can abut the first divider wall surface 230 (shown in FIG. 2A) of the divider wall 130 (shown in FIG. 1), and the second stop wall 674 can abut the inner sidewall surface 212 (shown in FIG. 2A) of the outer sidewall 110 (shown in FIG. 1) to aid in positioning the accessory tray 570 and preventing lateral sliding of the accessory tray 570 when the accessory tray 570 is mounted to the first compartment 140 (shown in FIG. 1). Further, the mounting ledge 582 can define a lower surface 676. Example aspects of the accessory tray 570 can be comprised of plastic, metal, wood, or any other suitable material known in the art or combination thereof. In one aspect, the accessory tray 570 can be formed from a clear acrylic material, which can allow for visibility through the accessory tray 570.

Figure 7:
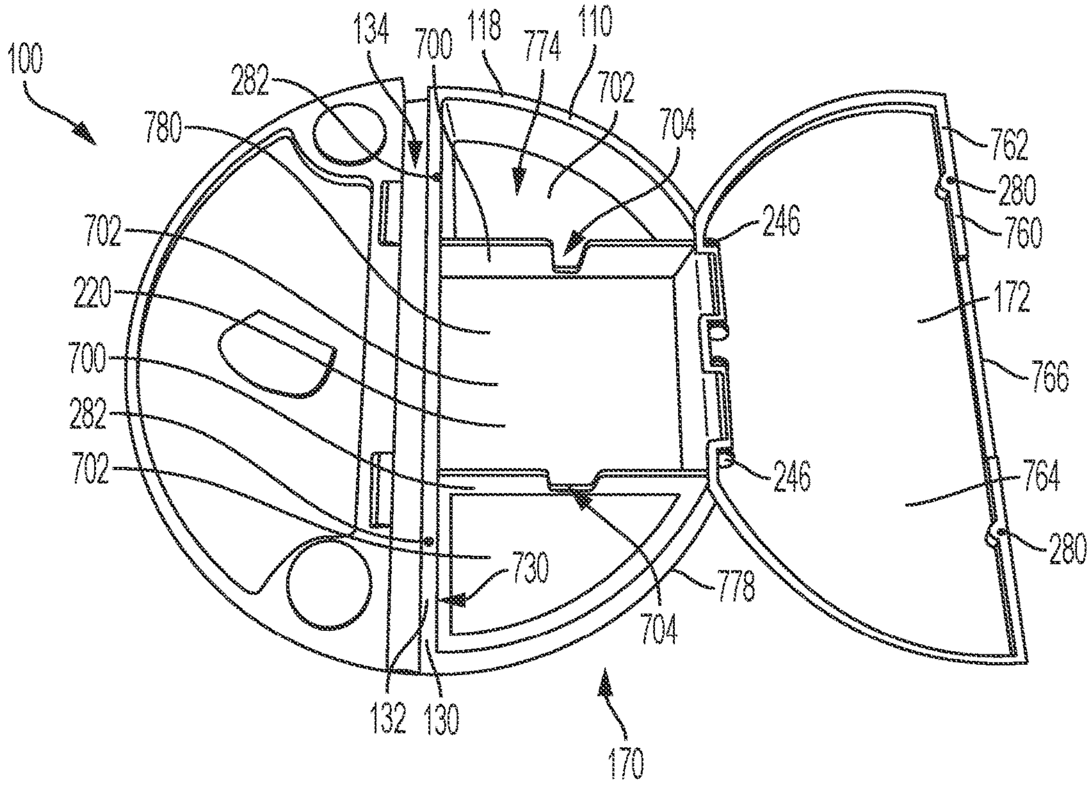
FIG. 7 is a top view showing an interior of a second compartment of the storage case of FIG. 1.

FIG. 7 illustrates the second lid 172 in the open position, such that the second opening 774 is uncovered and an interior of the second compartment 170 is visible. As shown, the divider wall 130 can define a second divider wall surface 730 opposite the first divider wall surface 230 (shown in FIG. 2A) and facing the interior of the second compartment 170. The divider wall 130 and a portion of the outer sidewall 110 can define a sidewall enclosure 778 of the second compartment 170, and a portion of the bottom wall 220 can define a floor 780 of the second compartment 170. The second opening 774 of the second compartment 170 can be defined by the top end 132 of the divider wall 130 and a portion of the top end 118 of the outer sidewall 110.

In example aspects, the second compartment 170 can comprise one or more sectioning walls 700. As shown, each of the sectioning walls 700 can extend generally upward from the floor 780, relative to the orientation shown, and can extend between the divider wall 130 and the outer sidewall 110 to section the interior of the second compartment 170 into a plurality of alcoves 702. The alcoves 702 can be configured to vary in size and shape dependent upon the orientation of the sectioning walls 700. Each of the alcoves 702 can be configured to receive various musical accessories therein. As shown, in some aspects, one or all of the sectioning walls 700 can define a notch 704 formed therein. In example aspects, a user can insert a finger through the notch 704 and can slide the finger upward through the notch 704, relative to the orientation shown, to facilitate lifting an accessory out of an adjacent alcove 702, such as packages holding guitar strings.

As shown, a second lid ridge 760 can extend from a peripheral edge 762 of a bottom surface 764 of the second lid 172. The second lid ridge 760 can be configured to abut a portion of the top end 118 of the outer sidewall 110 and the top end 132 of the divider wall 130 when the second lid 172 is in the closed position. According to example aspects, a second finger groove 766 can be formed in the second lid ridge 760, as shown. For example, the second finger groove 766 can be formed in the portion of the second lid ridge 760 that can abut the divider wall 130. In some aspects, the second finger groove 766 can be located substantially opposite from the second hinge 176. A user can engage the second finger groove 766 with one or more fingers and can lift the second lid 172 upward to pivot the second lid 172 from the closed position to the open position. As shown, the upper divider wall groove 134 formed in top end 132 of divider wall 130 can provide a clearance around the second finger groove 766 when the second lid 172 is in the closed position, such that it can be easily accessed by a user. In some aspects, the upper divider wall groove 134 can serve as a mount for an electronic device, such as a phone or a tablet, which can be removably mounted by placing a bottom edge of the electronic device in the divider wall groove 134 such that the screen faces the user. In other aspects, a separate mounting groove (not shown) can be formed in the storage case 100 for removably receiving an electronic device.

Similar to the first lid 142, the second lid 172 can further comprise one or more connectors, such as, for example, the magnets 280, attached thereto. As shown, the magnets 280 can be attached to the bottom surface 764 of the second lid 172 at or proximate to the second lid ridge 760. Mating connectors, such as the mating magnets 282, can be attached at the top end 132 of the divider wall 130, as shown. The magnets 280 and mating magnets 282 can mate together by magnetic force to releasably couple the second lid 172 to the divider wall 130 in the closed position. To move the second lid 172 to the open position, a sufficient amount of manual force can be applied to overcome the magnetic force and to pull/push the second lid 172 away from the divider wall 130.

Figure 8:
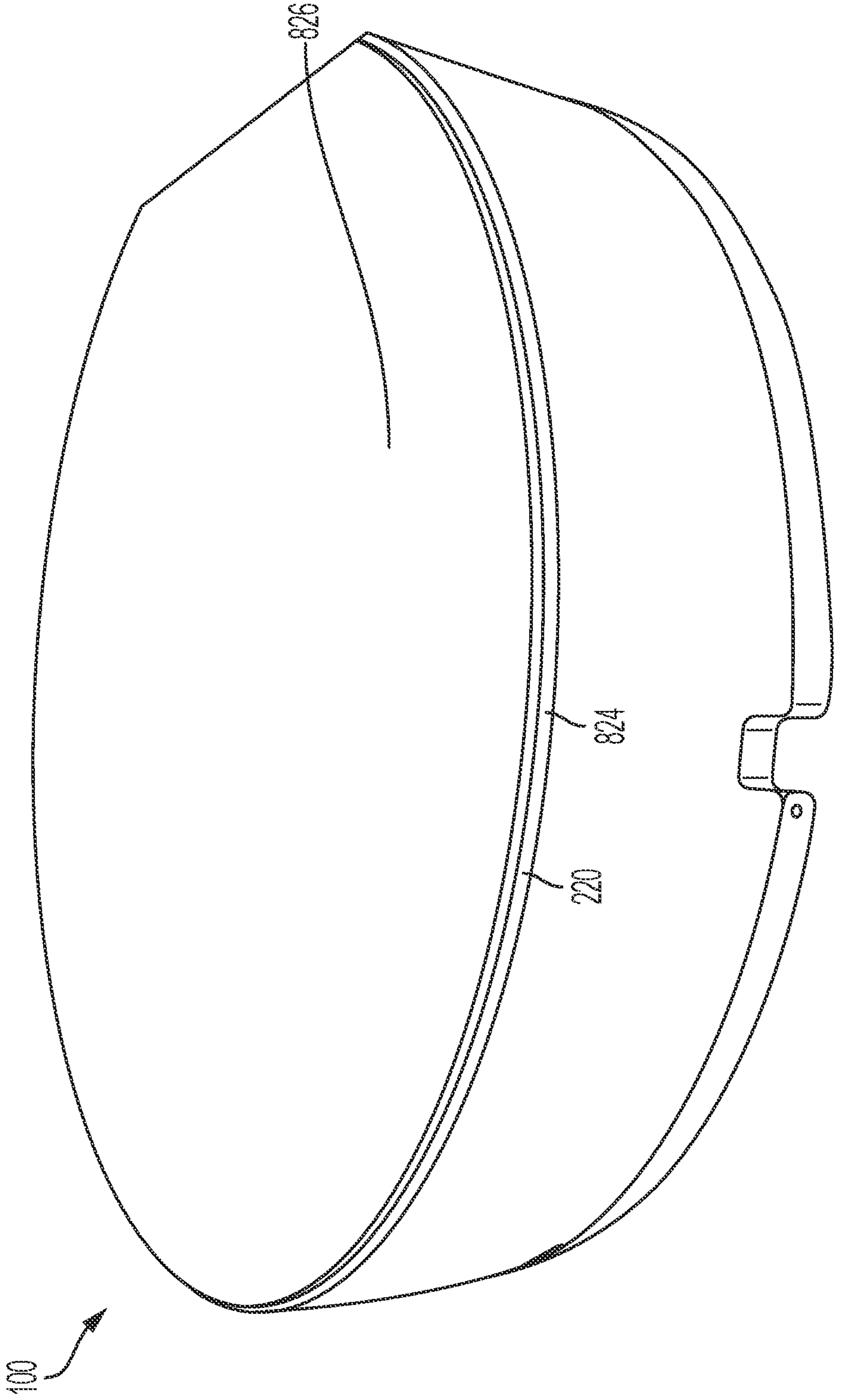
FIG. 8 is a bottom perspective view of the storage case of FIG. 1.

FIG. 8 illustrates a bottom perspective view of the storage case 100. As shown, according to example aspects, the lower bottom wall surface 824 of the bottom wall 220 can define a substantially planar surface and can be substantially circular in shape. In other aspects, the lower bottom wall surface 824 may not define a substantially planar surface. For example, in some aspects, the lower bottom wall surface 824 can define a beveled edge. In a particular aspect, as shown in FIG. 14, a bottom surface 1404 (shown in FIG. 14) of a bottom cap 1302 (shown in FIG. 13) of the storage case 100 can define a beveled edge. In some aspects, the storage case 100 can comprise one or more anti-slip features, such as a pad 826, attached to the lower bottom wall surface 824. The pad 826 can be formed from a non-slip material to define a non-slip lower bottom wall surface 824 of the bottom wall 200. The non-slip material can be for example, rubber, cork, foam, rubberized paint, or any other suitable non-slip material known in the art.

Figure 9:
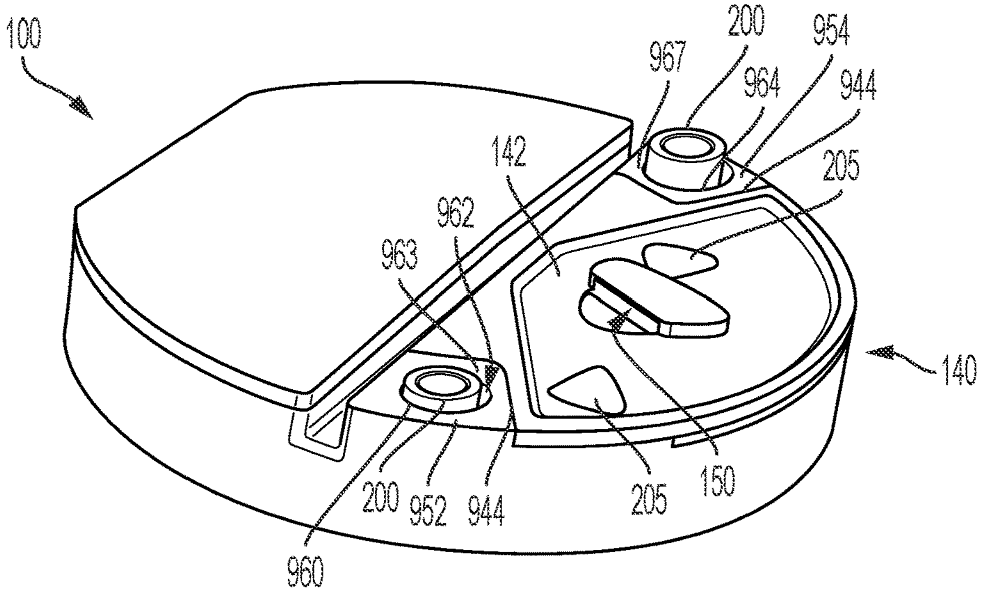
FIG. 9 is a top perspective view of the storage case, according to another aspect of the present disclosure.

FIG. 9 illustrates another aspect of the storage case 100 with the first lid 142 in the closed position. As shown, the storage case can define first and second mounting blocks 952, 954 in place of the first and second accessory mounts 252, 254 (shown in FIG. 2A). The first mounting block 952 can define a top surface 963 and a first opening 960 formed in the top surface. The first opening 960 can allow access to a first cylindrical recess 962 formed in the first mounting block 952. Similarly, the second mounting block 954 can define a top surface 967 and a second opening 964 formed in the top surface 967. A second cylindrical recess 1066 (shown in FIG. 10) can be formed in the second mounting block 954 and can be accessed through the second opening 964. In example aspects, each of the first and second cylindrical recesses 962, 1066 can be formed in an accessory receiver 1178 (shown in FIG. 11) of the corresponding mounting block 952, 954.

As illustrated, a slide 200 can be inserted through each of the first and second openings 960, 964 of the first and second mounting blocks 952, 954, respectively, and can be received in the corresponding first and second cylindrical recesses 962, 1066. Each of the first and second mounting blocks 952, 954 can define a bottom support (not shown) on which the slides 200 can be supported. In some example aspects, the bottom supports can be positioned at varying depths relative to the top surfaces 967, 967 of the corresponding mounting blocks 952, 954. As such, as shown, the slides 200 can be supported at varying heights above the floor 250 (shown in FIG. 10) of the first compartment 140 or slides 200 of different sizes can fit in the respective recesses 962, 1066. Furthermore, in some aspects, each of the first and second cylindrical recesses 962, 1066 can define varying diameters, such that the cylindrical recesses 962, 1066 can be sized to receive slides 200 of varying sizes.

In the present aspect, the first lid 142 can define a cutout 944 proximate each of the first and second mounting blocks 952, 954. According to example aspects, as shown, the top surfaces 963, 967 of the first and second mounting blocks 952, 954, respectively, can be substantially flush with the first lid 142 when the first lid 142 is in the closed position.

Figure 10:
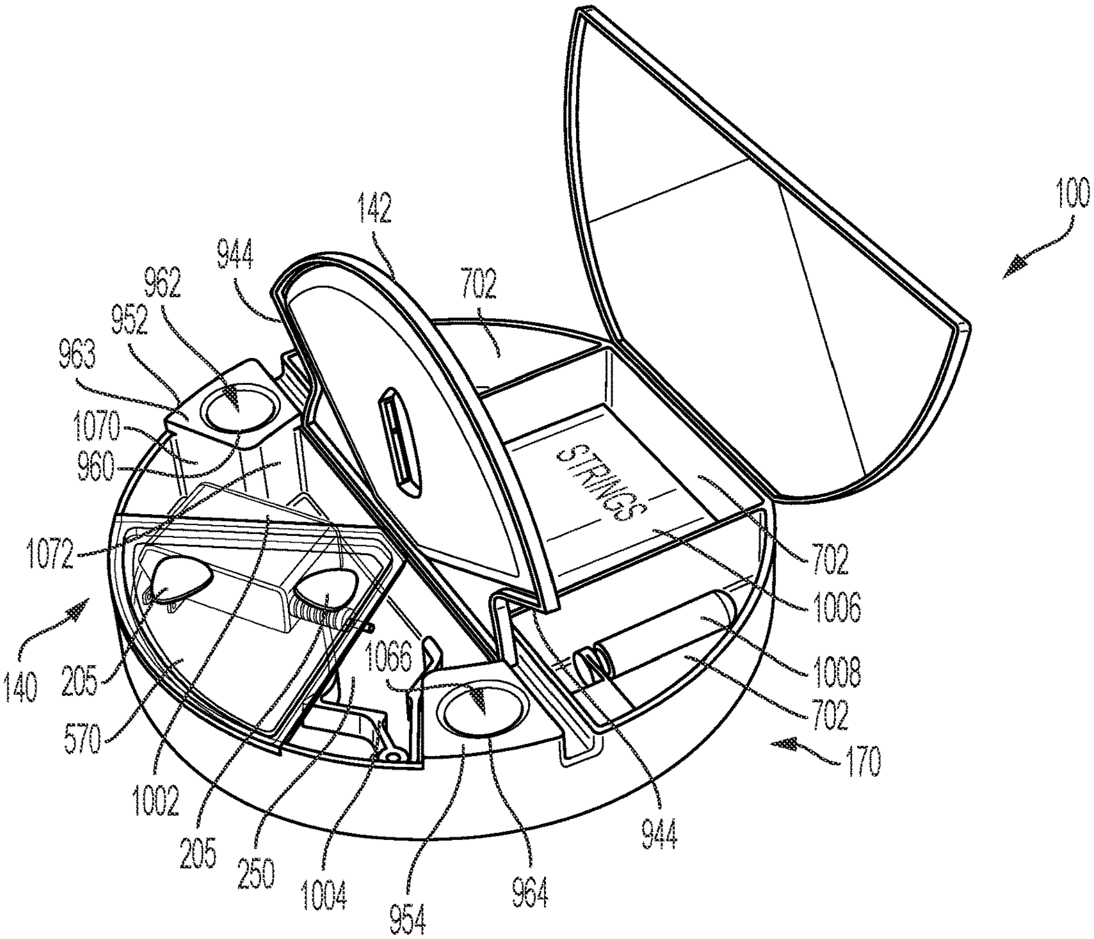
FIG. 10 is a top perspective view of the storage case of FIG. 9 showing interiors of the first and second compartments.

FIG. 10 illustrates the storage case 100 of FIG. 9 with the first lid 142 in the open position. As shown, the first mounting block 952 can define a mounting block sidewall 1070. The mounting block sidewall 1070 can define an outer surface 1072 and an inner surface 1174 (shown in FIG. 11). Example aspects of the second mounting block 954 can be similarly formed. FIG. 10 also illustrates various example accessories received in the first compartment 140 and second compartment 170. For example, in addition to the picks 205 and slides 200, the first and second compartments can be configured to receive accessories such as a guitar tuner 1002, a capo 1004, packs of guitar strings 1006, and a string winder 1008.

Figure 11:
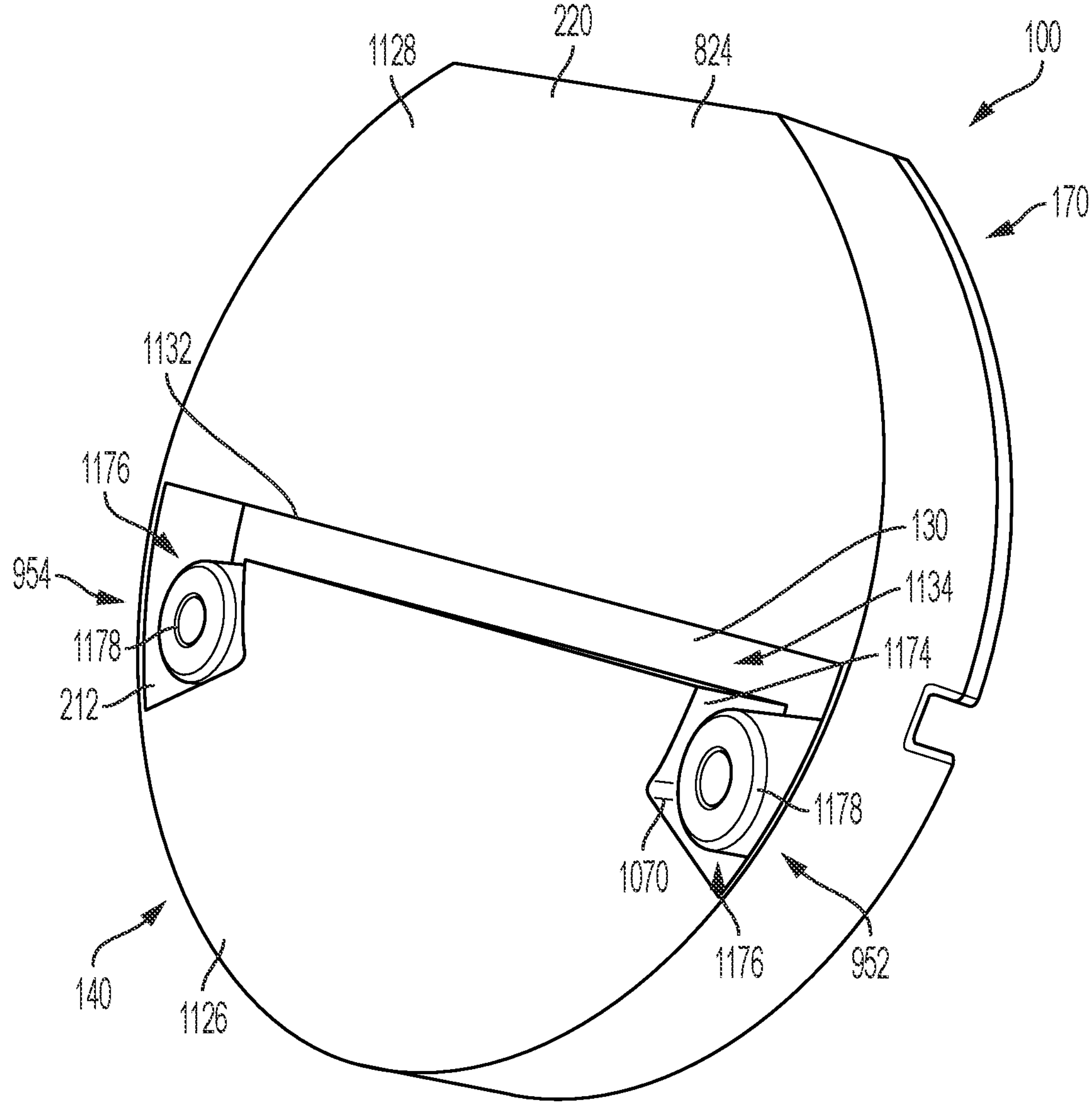
FIG. 11 is a bottom perspective view of the storage case of FIG. 9.

FIG. 11 illustrates a bottom perspective view of the storage case 100 of FIG. 9. As shown, according to example aspects, a bottom end 1132 of the divider wall 130 can define a lower divider wall groove 1134 formed lengthwise therein. The lower divider wall groove 1134 can divide the bottom wall 220 of the storage case 100 into a first bottom wall 1126 of the first compartment 140 and a second bottom wall 1128 of the second compartment 170. In the present example aspect, each of the mounting blocks 952, 954 can define a mounting block groove 1176 encircling the corresponding accessory receiver 1178. Each mounting block groove 1176 can be defined by the inner surface 1174 of the mounting block sidewall 1070, a portion of the inner sidewall surface 212, and a portion of the divider wall 130. As such, a portion of the lower divider wall groove 1134 can define a portion of each of the mounting block grooves 1176.

Figure 12:
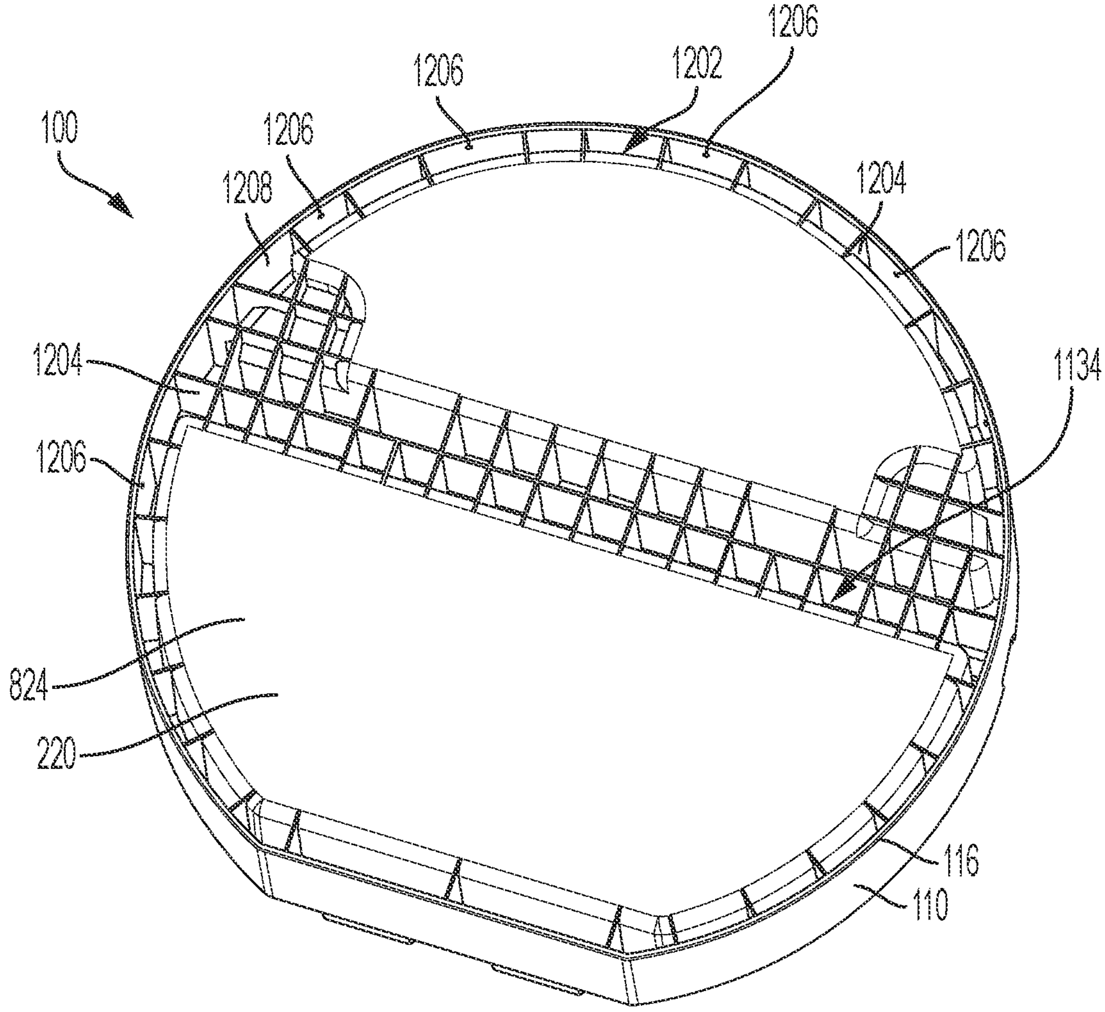
FIG. 12 is a bottom perspective view of the storage case, according to another aspect of the present disclosure.

FIG. 12 illustrates a bottom perspective view of the storage case 100, according to another aspect of the disclosure. In the present aspect, a peripheral groove 1202 can be formed in the lower bottom wall surface 824 of the bottom wall 220 proximate the bottom end 116 of the outer sidewall 110. As shown, webbing 1204 can be formed in the peripheral groove 1202 and the lower divider wall groove 1134 to reinforce the structure of the storage case 100 and allow for lower material costs to avoid filling the lower divider wall groove 1134 and peripheral groove 1202 with solid material. Connector recesses 1206 can be formed in a groove surface 1208 of the outer sidewall 110 within the peripheral groove 1202.

Figure 13:
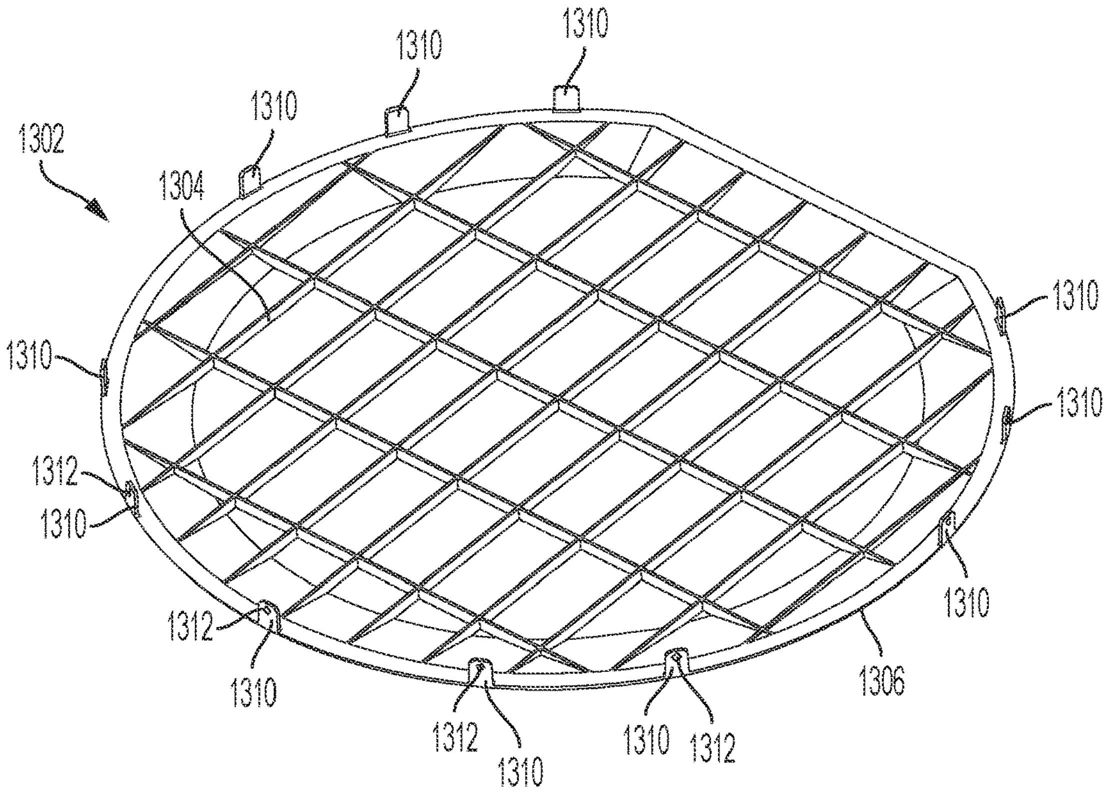
FIG. 13 is a top perspective view of a bottom cap, according to an aspect of the present disclosure.
Figure 14:
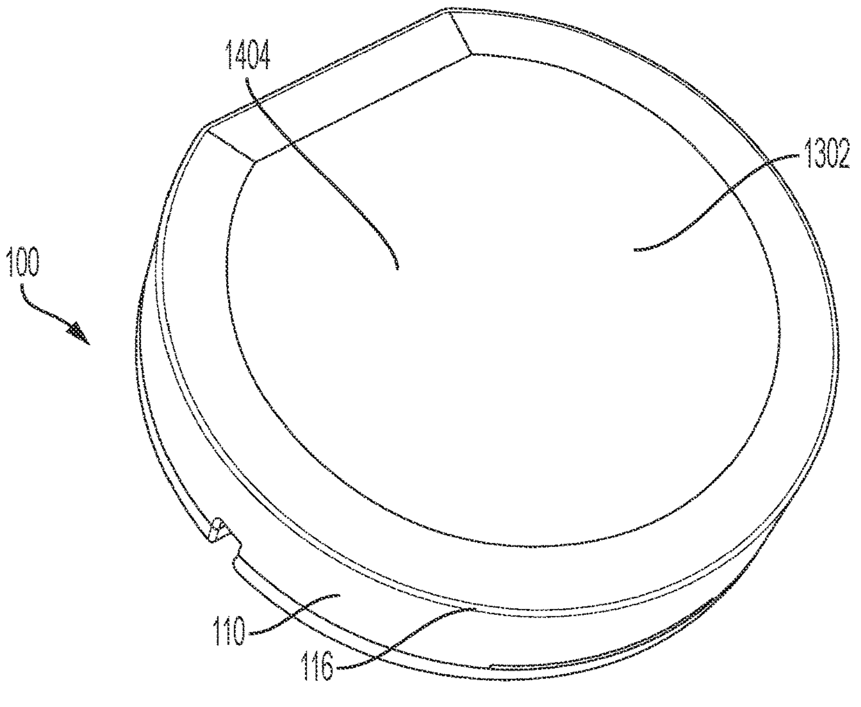
FIG. 14 is a bottom perspective view of the bottom cap of FIG. 13 coupled to the storage case of FIG. 12.

FIG. 13 illustrates an example aspect of a bottom cap 1302 for covering the peripheral groove 1202 (shown in FIG. 12) and lower divider wall groove 1134 (shown in FIG. 12) of the storage case 100 (shown in FIG. 12). Example aspects of the bottom cap 1302 can comprise webbing 1304 for providing a reinforced structure. Connectors 1310 can extend from the bottom cap 1302 substantially around a periphery 1306 of the bottom cap 1302. Each of the connectors 1310 can define a connector tab 1312 projecting therefrom. According to example aspects, each of the connectors 110 can be aligned with a corresponding connector recess 1206 (shown in FIG. 12) of the peripheral groove 1202 (shown in FIG. 12) and can be inserted into the peripheral groove 1202. Each of the connector tabs 1312 can engage a corresponding one of the connector recesses 1206 to attach the bottom cap 1302 to the storage case 100.

FIG. 14 illustrates the bottom cap 1302 attached to the storage case 100 proximate the bottom end 116 of the outer sidewall 110. As shown, the bottom cap 1302 can define a beveled edge in some aspects. Furthermore, according to example aspects, a bottom surface 1404 of the bottom cap 1302, or a portion thereof, can define a non-slip surface. For example, the bottom surface 1404 can be formed from or coated with a non-slip material to aid in preventing the storage case 100 from sliding when set on a support surface (e.g., a table). In a particular aspect, the bottom cap 1302 can be formed from a plastic material and the bottom surface 1404 can be coated with a rubberized paint. In other aspects, the bottom cap 1302 can comprise rubber, cork, foam, or any other suitable non-slip material known in the art. In still other aspects, the bottom surface 1404 can be textured to increase friction between the bottom surface 1404 of the bottom cap 1302 and the support surface. According to various aspects, a logo (not shown) or other image can be embossed or otherwise formed in the bottom surface 1404.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A storage case for musical accessories, the storage case comprising:
- a bottom wall;
- an outer sidewall extending from the bottom wall, the outer sidewall and bottom wall defining an interior space;
- a divider wall extending from the bottom wall between a first location on the outer sidewall and a second location on the outer sidewall, the divider wall configured to divide the interior space into a first compartment and a second compartment;
- a first lid hingedly attached to the first compartment and configured to enclose the first compartment; and
- a second lid hingedly attached to the second compartment and configured to enclose the second compartment;
- wherein the first lid defines an orifice configured to receive a musical accessory therethrough, the orifice allowing access to an interior of the first compartment;
- wherein the orifice is a slot sized to receive a substantially flat musical accessory therethrough, and
- an accessory tray mounted within the first compartment above the bottom wall, the accessory tray aligned with the slot and configured to support the musical accessory received through the slot.

2. The storage case of claim 1, further comprising a sectioning wall extending from the bottom wall between the divider wall and the outer sidewall to section the first compartment into a plurality of alcoves.

3. The storage case of claim 2, wherein the sectioning wall defines a notch at a top end of the sectioning wall.

4. The storage case of claim 2, wherein the sectioning wall is a first sectioning wall, the storage case further comprising a second sectioning wall, the first and second sectioning walls sectioning the first compartment into at least three alcoves.

5. The storage case of claim 1, wherein the first lid is hingedly attached to the divider wall, and the second lid is hingedly attached to the outer sidewall.

6. The storage case of claim 5, wherein one of the first lid and the second lid comprises a connector, one of the outer sidewall and the divider wall comprises a mating connector, and the connector is configured to engage the mating connector to retain the one of the first lid and the second lid in a closed position.

7. The storage case of claim 6, wherein the connector is a magnet and the mating connector is a mating magnet.

8. The storage case of claim 1, wherein the accessory tray is removably mounted within the first compartment and is supported on the outer sidewall and the divider wall.

9. The storage case of claim 8, wherein the divider wall defines a first accessory tray recess at a top end of the divider wall and the outer sidewall defines a second accessory tray recess at a top end of the outer sidewall, the accessory tray supported on each of the first accessory tray recess and the second accessory tray recess.

10. The storage case of claim 1, wherein the bottom wall comprises a non-slip lower bottom wall surface.

11. A storage case for musical accessories, the storage case comprising:

a bottom wall;

an outer sidewall extending from the bottom wall, the outer sidewall and bottom wall defining an interior space;

a divider wall extending from the bottom wall between a first location on the outer sidewall and a second location on the outer sidewall, the divider wall configured to divide the interior space into a first compartment and a second compartment;

a first lid hingedly attached to the first compartment and configured to enclose the first compartment; and a second lid hingedly attached to the second compartment and configured to enclose the second compartment;

wherein the first lid defines an orifice configured to receive a musical accessory therethrough, the orifice allowing access to an interior of the first compartment;

wherein the orifice is a substantially circular bore sized to receive a substantially cylindrical musical accessory therethrough.

12. The storage case of claim 11, further comprising a substantially cylindrical accessory mount extending from the bottom wall towards the first lid, the substantially cylindrical accessory mount aligned with the substantially circular bore and configured to engage the musical accessory received through the substantially circular bore.

13. A storage case for musical accessories, the storage case comprising:

a first compartment defining a first opening at a top end thereof;

a second compartment defining a second opening at a top end thereof, the second compartment comprising a sectioning wall that sections the second compartment into a plurality of alcoves;

a first lid configured to cover the first opening of the first compartment, the first lid defining an orifice allowing access to an interior of the first compartment; and a second lid configured to cover the second opening of the second compartment;

wherein the first lid defines an orifice configured to receive a musical accessory therethrough, the orifice allowing access to an interior of the first compartment;

wherein the orifice is a substantially circular bore sized to receive a substantially cylindrical musical accessory therethrough.

14. The storage case of claim 13, wherein the first lid is hingedly coupled to the first compartment and the second lid is hingedly coupled to the second compartment.

15. The storage case of claim 13, wherein the sectioning wall defines a notch at a top end of the sectioning wall.

16. The storage case of claim 13, wherein: the orifice is a slot sized to receive a substantially flat musical accessory therethrough; the storage case further comprises an accessory tray mounted within the first compartment; and the accessory tray is aligned with the slot and is configured to support the substantially flat musical accessory received through the slot.

17. The storage case of claim 13, wherein: the orifice is a substantially circular bore sized to receive a substantially cylindrical musical accessory therethrough; a substantially cylindrical accessory mount extends within the first compartment towards first lid; and the substantially cylindrical accessory mount is aligned with the substantially circular bore and configured to engage the substantially cylindrical musical accessory received through the substantially circular bore.

* * * * *